May 29, 1962          J. MARTIN          3,036,799
MEANS FOR RELEASING A SUBSIDIARY BODY FROM
A MAIN BODY IN FLIGHT
Filed Oct. 4, 1960          3 Sheets-Sheet 1
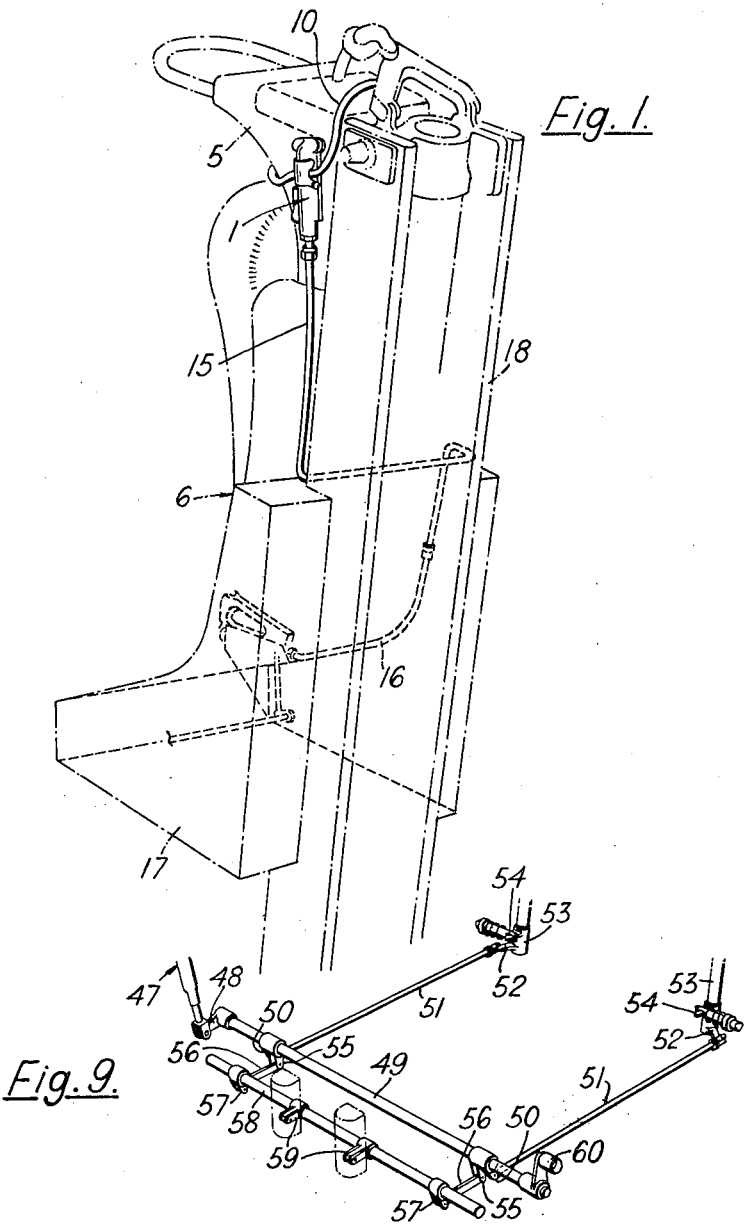
Inventor
JAMES MARTIN
By *[signature]*
AGENT May 29, 1962 J. MARTIN 3,036,799
MEANS FOR RELEASING A SUBSIDIARY BODY FROM
A MAIN BODY IN FLIGHT
Filed Oct. 4, 1960 3 Sheets-Sheet 2
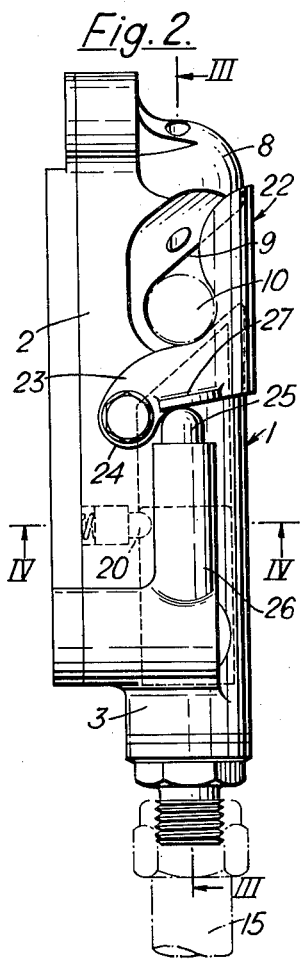
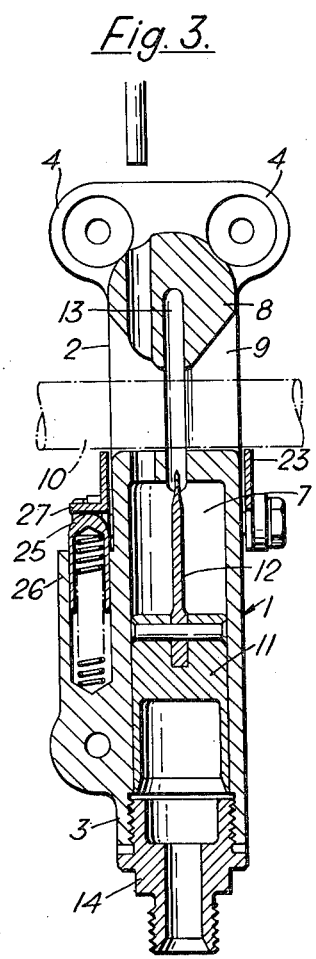
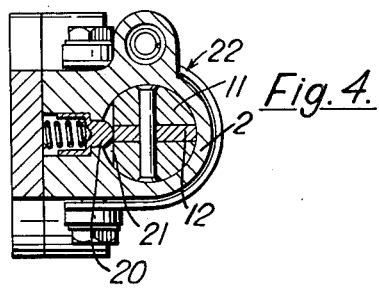
Inventor
JAMES MARTIN
By
AGENT

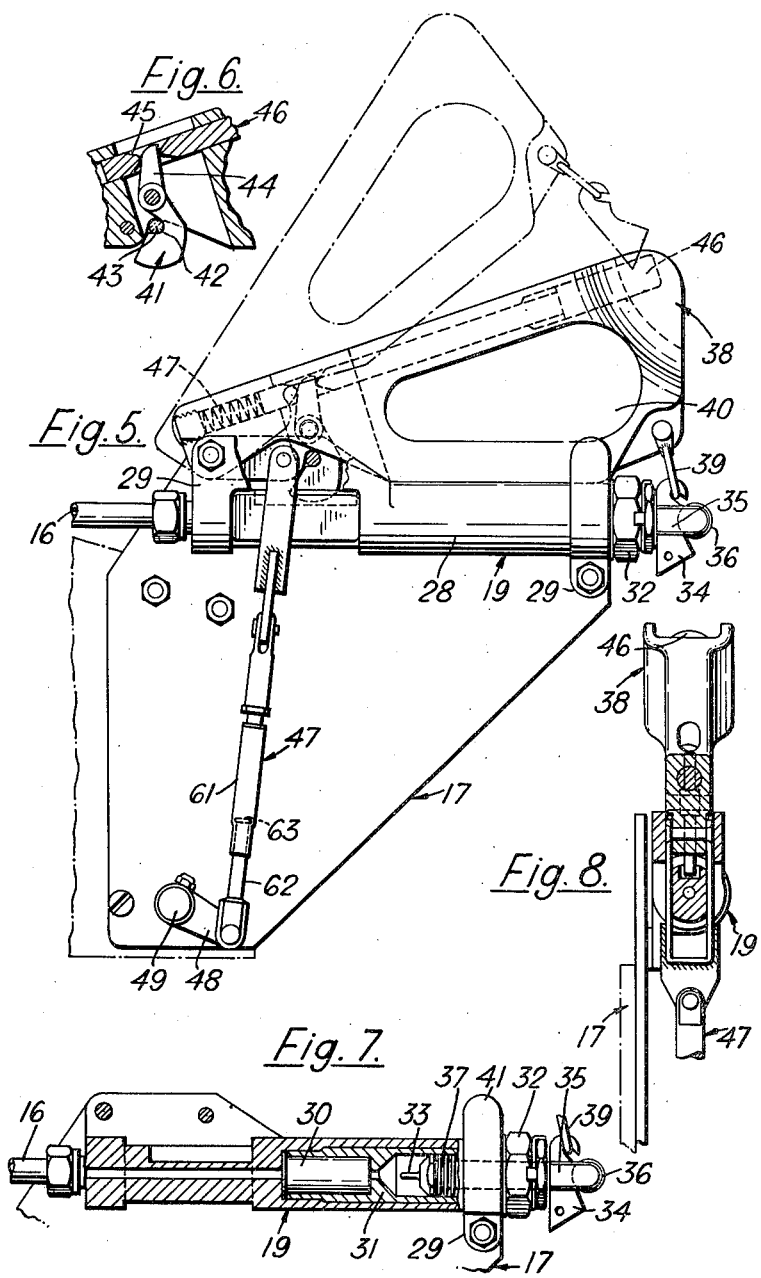

3,036,799
MEANS FOR RELEASING A SUBSIDIARY BODY
FROM A MAIN BODY IN FLIGHT
James Martin, Southlands Manor, Southlands Road,
Denham, near Uxbridge, England
Filed Oct. 4, 1960, Ser. No. 60,363
Claims priority, application Great Britain Oct. 16, 1959
9 Claims. (Cl. 244—141)

This invention concerns line or cable cutter units for severing lines or cables (hereinafter called "lines"), and is particularly concerned with an improved arrangement in a cutter particularly adapted for severing, in an emergency, a parachute withdrawal line leading from a parachute to other equipment. The invention is especially applicable to bodies, and particularly aircraft ejection seats, adapted to be projected into the air and having equipment separable therefrom, the separation of this equipment from the said body being effected by a drogue parachute connected to such equipment by a withdrawal line.

Whilst the invention is applicable to bodies of the general character above referred to, it is primarily concerned with so-called automatic aircraft ejection seats and will hereinafter be described as applied thereto, these seats being of the type in which, on the seat being launched from the aircraft, a drogue parachute is deployed to slow down and adjust the attitude of the seat before the airman is separated from the latter, and wherein the drogue parachute line is, as well as being connected to the ejection seat, also connected to the airman's or seat occupant's main or personal parachute (hereinafter referred to as the "personal parachute") so that, on the drogue parachute being released from the ejection seat, it automatically withdraws the said personal parachute for deployment. Such an arrangement is described in my United States Patent No. 2,708,083.

In certain circumstances, e.g. in the event of failure of the drogue gun to operate and deploy the drogue parachute, or in the event of the time delay mechanism controlling the release of the drogue parachute from the ejection seat, becoming damaged, for example in battle, or being otherwise rendered inoperative, the airman or seat occupant may wish urgently to disconnect his personal parachute from the drogue parachute. At the same time, in the case of an automatic ejection seat, such as that described in Patent No. 2,708,083, having seat and shoulder harness locks, or such as the similar Martin-Baker Mk.A4 or Mk.A5 ejection seat which also has leg and/or arm restraining means, as described in my copending United States Patent applications Nos. 723,794, now Patent No. 2,944,774, 723,705 and 716,304, now Patent No. 2,929,587 the airman will wish to disconnect himself from the ejection seat by releasing the locks by means of which his seat harness, leg restraining means and the like are secured to the latter.

In the arrangement described in the United States Patent No. 2,708,083, it is possible for the seat occupant accidentally to release his personal parachute from the ejection seat before he frees himself from the latter, which could lead to his being injured if he does not take prompt action to rectify the position.

It is therefore an object of the invention to provide means for eliminating or reducing this danger.

Thus according to one aspect of this invention, there is provided, in or for a structure adapted to be launched into the air and including a main body, releasable means for attaching a subsidiary body to said main body, a drogue parachute, adapted to be deployed after the launching of the said apparatus, a line connecting said drogue parachute to said main body, and means adapted automatically to release said drogue parachute line from said main body after deployment of the drogue parachute and simultaneously to effect, in normal operation, the release of said attachment means, a line cutter on said main body for severing said line in the event of the latter not being automatically released from said main body, means connecting said line cutter to the release means for said attachment means, and means for actuating said line cutter to cause it to sever said line from said main body and for simultaneously releasing said attachment means.

As mentioned above, the invention is particularly applicable to aircraft ejection seats and thus, according to a further aspect of the invention, there is provided, in or for an aircraft ejection seat including a drogue parachute, an airman's personal parachute and a line connecting the drogue parachute to the personal parachute, a line cutter for severing the said line in an emergency and including manually operable means for effecting its actuation, and means automatically operable on actuation of the line cutter to effect the release of the locks by means of which the airman is secured to the ejection seat.

Preferably, and in accordance with a further feature of the invention, the said line cutter actuating means may comprise a hand-operable lever, such lever also being adapted to act as an over-riding manual control for releasing the said locks on the ejection seat.

Desirably, a lost motion device may be provided in the means connecting said line cutter actuating means with said locks, so that the said locks may be released by separate means without actuation of the line cutter. Thus, when the airman wishes to vacate his seat in normal circumstances, carrying his combined seat and body harness with him, he may release himself from the seat by operation of said separate unlocking means without simultaneously actuating the line cutter.

In a preferred form of the invention, means are provided for preventing unintentional movement of said line cutter actuating means to its operative position, and such means may conveniently comprise a push button mechanism mounted in the said hand-operable lever and co-operating with stop means normally spring biased to a position in which it prevents cutter actuating movement of the said lever, but movable by said push button into a lever freeing position. Means may also be provided for preventing unintentional return movement of the said line cutter actuating means from its operative to its inoperative position.

Preferably, the line cutter will be arranged to be operated by means of gas pressure and may conveniently comprise a cutting head having an open-sided anvil forming recess to receive and normally to locate a portion of said line, a knife mounted for guided movement through said recess transversely thereof for severing said line, a gas pressure operated piston for moving said knife in a line cutting direction, a combustion chamber adapted to receive a detonable explosive cartridge, conduit means for conveying gas pressure generated in such combustion chamber to said piston, and firing mechanism for detonating said cartridge, the said line cutter actuating means being arranged to operate the said firing mechanism.

In a convenient form of the invention the said cutting head, knife and piston are situated, or are adapted to be situated, adjacent the top of the ejection seat frame, and the said combustion chamber, firing mechanism and actuating means are located, or are adapted to be located, at the side of the seat pan or bucket. In these circumstances, and where the said seat pan or bucket is adjustable up and down the frame of the ejection seat as described, for example, in my Patent No. 2,527,020 then the said conduit means may include a flexible portion so as to permit of such relative movement between the seat pan or bucket and the frame of the ejection seat.

A protective and retaining cover may be provided for normally bridging over the part of the line located in the said recess, said cover being displaceable to permit the initial location of the line in said recess and also to permit the withdrawal of the line from the recess in normal circumstances.

In order that the invention may be more readily understood, one embodiment of the same will now be described by way of example and with reference to the accompanying drawings, in which:

FIGURE 1 is a general view of a main body in the form of an aircraft ejection seat provided with a line cutter according to the invention;

FIGURE 2 is a side elevation of the cutter unit;

FIGURE 3 is a section on the line III—III of FIGURE 2;

FIGURE 4 is a section on the line IV—IV of FIGURE 2;

FIGURE 5 is a side elevation of the line cutter combustion chamber and its controls;

FIGURE 6 is a sectional side elevation of the locking means for the line cutter firing handle;

FIGURE 7 is a side elevation, partly in section, of the line cutter combustion chamber;

FIGURE 8 is an end elevation, partly in section, of the apparatus shown in FIGURE 5; and FIGURE 9 is a perspective view showing the manner in which the line cutter controls co-operate with the locks for retaining an airman in the ejection seat.

In this embodiment of the invention the line cutter unit (see FIGURES 2 to 4) comprises an elongated housing 1 of which the upper part 2 (FIGURE 2) is of approximately D-shaped horizontal cross-section, whilst the lower part 3 is of cylindrical shape in horizontal cross-section. At its rear the upper part 2 of the housing is furnished with lugs 4 by which it may be bolted to a drogue parachute housing 5 enclosing the drogue parachute of an ejection seat 6.

For the major part of its length and extending from the lower end thereof, the housing 1 is furnished with a cylindrical bore 7 coaxial with the cylindrical lower part 3 of the housing, whilst above this bore the housing constitutes a substantially solid cutting head or anvil 8 having a transverse deeply incised, downwardly and rearwardly sloping round-bottomed recess 9 to receive a line 10 serving to connect the said drogue parachute to the personal parachute for an airman or occupant using the aircraft ejection seat.

The axis of the line-receiving recess 9 is at right angles to the axis of the cylindrical lower part 3 of the housing 1 and is intersected by the latter axis. The upper and lower corners of the recess are heavily radiused to avoid chaffing of the line 10. The bore 7 within the housing 1 extends upwardly to within a short distance of the bottom of the line-receiving recess 9 and in this bore is reciprocably mounted a cylindrical piston 11 constituting a knife carrier and in the upper end of which is replaceably diametrically fixed an upstanding knife 12 in the form of a blade having its rear part projecting into, and guided in, a narrow slot 13 extending longitudinally of the rear of the housing 1 and located in the same diametrical plane of the bore 7 as is the blade 12, the engagement of the blade in the slot 13 preventing rotation of the piston 11 and the knife blade 12 in the bore and maintaining the width of the blade at right angles to the axis of the lower end of the line-receiving recess 9 in the cutting head 8 of the unit.

The upper part of the longitudinal slot 13 extends from the rear surfaces of the said housing through the cutting head 8 almost to the front of the latter to permit the knife blade to enter the head of the unit during the latter part of its cutting stroke.

The lower end of the cylindrical portion 3 of the housing is furnished with a tubular cap 14 screwed thereinto and this cap is coupled by a length of flexible tubing 15 to the upper end of a length of rigid tubing 16 secured to one side of the seat pan 17 of the ejection seat so that communication between this rigid length of tubing 16 and the housing 1 can be maintained in spite of relative adjustment between the seat pan 17 and the seat frame 18.

The lower end of the rigid tubing 16 is gas-tightly connected to the rear end of a combustion chamber or cylinder 19 subsequently described and which is fixed to one side of the seat pan 17.

The upper cutting edge of the knife blade 12 is oblique to the axis of the bore 7 and roughly parallel to the upper and lower walls of the line-receiving recess 9, the knife operating in the manner of a guillotine.

The piston 11 is normally retained in the lower part of the bore 7 (in which it is a gas-tight sliding fit by means of a spring pressed plunger or detent 20 located in the rear wall of the housing 1 and having its inner end received in a transverse recess 21 in the periphery of the piston 11, the detent 20 and the recess 21 being so formed that when the piston is subjected to gas pressure as subsequently described, the piston frees itself from the detent and ascends in the housing 1 so that the blade 12 carried by the piston passes through the line-receiving recess 9 to sever the line 10 in the latter.

In order to retain the parachute line 10 normally in the downwardly inclined line-receiving recess 9 in the cutting head 8 and to protect the line whilst permitting it readily to be inserted laterally, i.e. transversely of the axis of, into or withdrawn laterally from the recess 9 when required, a pivoted cover member 22 of substantially U-shaped horizontal cross-section is provided to bridge the mouth of the recess and is shaped to match the front shape of the housing 1, this cover 22 being furnished with a pair of arms 23 embracing between them the upper part 2 of the housing. The rear edges 24 of the arms 23 of the cover are of a sinuous shape so that the lower parts of these edges are complementary to the circular form of the base portion of the line-receiving recess 9, whilst the upper parts of the edges 24 are reversely curved so that, when the line 10 is pulled transversely of its length from the recess 9, the line tends to swing the cover member 22 outwardly and downwardly to uncover the mouth of the line-receiving recess. The cover 22 is urged to its closed position by a spring plunger 25 slidably mounted in a boss 26 extending longitudinally along one side of the housing 1, the end part of the plunger 25 abutting against a laterally projecting lug 27 of one of the side arms 23 of the cover 22.

The combustion chamber 19 above referred to (see FIGURES 5 to 8) comprises a cylinder 28 furnished with attachment lugs 29 by which it may be secured to the side wall of the seat pan 17 of the ejection seat in a substantially horizontal position. The rear part of the cylinder 28 communicates with the lower end of the hereinbefore mentioned length of rigid tubing 16 which leads to the housing 1 carrying the piston 11.

The combustion chamber 19 is adapted to receive an explosive cartridge 30 furnished with a firing cap 31 at its front end which, when the cartridge is located in the chamber 19, is disposed within the front end of the chamber into which is removably screwed a breech block 32 carrying centrally a firing pin 33 coaxial with the said chamber. The firing pin 33 is spring loaded so as to tend to move forcibly inwardly of the combustion chamber 19, the firing pin normally being held in its inoperative position by means of a withdrawable sear 34 passing diametrically through a bifurcated outer end portion 35 of the firing pin, the outer edge of the sear engaging against a roller 36 located within the bifurcated outer portion 35 of the firing pin through which the sear passes whilst the opposite or inner edge of the sear 34 presses against the outer end surfaces of the breech block 32 of the combustion chamber. The sear 34 is substantially wedge-shaped so that when it is withdrawn from the bifurcated end 35 of the firing pin 33 when it is desired to fire the cartridge 30, the firing pin is first withdrawn somewhat so as to stress the spring 37 of the firing mechanism before releasing the firing pin to perform its firing action.

The withdrawal of the sear is effected by a manually operable firing lever 38. This lever is connected by a link 39 at its front end to the sear 34 and at its rear end is pivoted to the lugs or flanges 29 at the rear end of the combustion chamber 19. The manually operable firing lever 38 is of isosceles triangular form in side elevation, the lever being located and pivotal in a vertical plane with the apex forming the pivoted end of the lever. A hand hole 40 is provided in the lever 38 towards the forward part of it to enable the user readily to grasp the lever. The lower part of the firing lever is normally situated between the upstanding flanges 29 of the combustion chamber 19, these flanges serving to position and guide the firing lever in at least the first part of its firing motion.

To prevent the firing lever 38 being actuated accidentally, a catch or latch is provided which is releasable by thumb or finger pressure by the user of the said lever. This catch or latch comprises a hooked pawl 41 (see FIGURE 6) pivoted to the rear portion of the lever 38 in front of the pivot of the latter to the combustion chamber 19, the hooked end 42 of the said pawl being adapted to engage around a pin 43 fixed to the combustion chamber or the extension flanges 29 thereof. On the opposite side of its pivot to that on which the hooked portion of the pawl is located, the latter has an arm 44 which engages in a diametrical slot 45 in the rear end of a plunger 46 slidable longitudinally in the firing handle 38, this plunger being urged by a compression spring 47 forwardly in order to maintain the hooked pawl 41 in its firing lever locking position until pressure is applied to the forward end of the plunger 46, e.g. by thumb pressure on the part of the airman or seat occupant when desirous of operating the firing handle 38 to withdraw the sear 34.

In order that the firing lever 38 may not accidentally return to its normal position after being operated to effect cutting of the line 10, the lower edge of the hooked pawl 41 is arranged to re-engage the pin 43 attached to the combustion chamber 19 but on the upper side of the said pin, thus preventing the return or depression of the firing lever 38 to its original position unless the plunger 46 is operated to disengage the pawl 41 from the said pin.

Thus if the airman presses the releasing plunger 46 rearwardly he will release the firing lever 38 and may thereafter pull it upwardly and so withdraw the sear 34 from the firing pin 33, first arming the latter and then releasing it so that the cartridge 30 is fired. A high gas pressure is generated in the combustion chamber 19, which pressure is transmitted through the fixed rigid tubing 16 and the flexible tubing 15 to the cylinder 7 in which the cutting knife-carrying piston 11 is mounted. The latter will then be forcibly urged upwardly and the line 10 passing through the line-receiving recess 9 will be severed and the personal parachute released from the drogue parachute and from the ejection seat. This action will, of course, only be taken in an emergency and when it is necessary for the personal parachute to be released from the drogue parachute and from the ejection seat.

The manner in which the firing handle 38 is arranged to co-operate with and, in an emergency, to control the release of the locks by means of which an airman is secured in the ejection seat will now be described with particular reference to FIGURES 5 and 9 of the drawings. In this embodiment of the invention, the said locks are arranged substantially in the manner described in my copending United States patent application No. 723,794.

The firing lever 38 is connected by means of a link 47 to a crank 48 keyed to a horizontal shaft 49 extending transversely across the underside of the seat pan 17 of the ejection seat. The shaft 49 has keyed thereto further cranks 50, each of which is pivotally connected to a shaft 51 extending rearwardly and pivotally connected at its rear end by means of a crank 52 to a substantially vertical torsion shaft 53 carrying the locking members 54 of the seat harness locks of the ejection seat. It will thus be seen that, when the link 47 is moved upwardly upon displacement of the firing handle 38, the transverse shaft 49 is rotated causing the cranks 50 to draw the shafts 51 forwardly, and the torsion shafts 53 are thus rotated about their axes so as to move the locking members 54 of the seat harness locks in an unlocking direction.

Also keyed to the transverse shaft 49 are further downwardly extending cranks 55, to the lower ends of which are pivotally secured arms 56 themselves pivotally connected to cranks 57 secured on a second transverse shaft 58 which carries the locking members 59 for the airman's leg restraining lines 60. Thus, rotation of the transverse shaft 49 as described above causes a corresponding rotation of the second transverse shaft 58, rotation of which latter shaft withdraws the leg restraining lines locking members 59 so as to release the airman's legs from the ejection seat.

The transverse shaft 49 is provided with a manual over-ride control lever 60 intended solely for releasing the seat harness locks and leg restraining line locks in normal circumstances and, in order that the transverse shaft 49 may be operated when desired without affecting the firing lever 38 for the cutter unit, the link 47 connecting this shaft to the firing handle is arranged to afford lost motion by being formed in two parts 61 and 62 telescoping together, the part 62 being formed with a boss 63 so that, when the firing lever 38 is operated, the link 47 transmits the movement of this lever to the crank 48 and transverse shaft 49, but when the transverse shaft is operated independently of the said firing lever (i.e. by means of the control lever 60) no motion is transmitted to the said lever.

It should be understood that, although the invention has been described above with particular reference to its application to an aircraft ejection seat and the release of an airman therefrom, the invention may find other applications, particularly in the field of rocketry; it could, for example, be applied to the release of a capsule or the like from a rocket or other space vehicle.

I claim:

1. In a structure adapted to be launched into the air and including a main body, a subsidiary body, means for attaching said subsidiary body to said main body, release means connected to said attachment means and acting upon operation to release the same, a drogue parachute adapted to be deployed after the launching of the said structure, a line connecting said drogue parachute to said main body, and means on said main body adapted automatically to release said drogue parachute line from said main body after deployment of the drogue parachute and simultaneously to effect, in normal operation, the release of said attachment means: a line cutter on said main body for severing said line in the event of the latter not being automatically released from said main body; means connecting said line cutter to the release means for said attachment means; and means for actuating said line cutter to cause the severance of said line from said main body and the simultaneous release of said attachment means.

2. In an aircraft ejection seat including locks for securing an airman's harness to said seat, said airman having a personal parachute, release means connected to said locks and acting upon operation to release the same, a drogue parachute adapted to be deployed after the ejection of the seat, a line for connecting said drogue parachute to the seat and to the airman's personal parachute, and means on the seat adapted automatically to release said drogue parachute line therefrom after deployment of the drogue parachute and simultaneously to effect, in normal operation, the release of said locks: a line cutter on the ejection seat for severing said line to free the said personal parachute from the ejection seat in the event of the line not being automatically released from the seat; means for actuating the line cutter; means connecting said line cutter actuating means to the release means for said locks; operation of said cutter actuating means serving to cause the severance of said line to release the personal parachute and also for effecting the simultaneous release of said locks.

3. Apparatus as claimed in claim 2, wherein the said line cutter actuating means comprises a hand-operable lever, such lever also being connected to said locks to act as an over-riding manual control for releasing the latter.

4. Apparatus as claimed in claim 3, wherein a lost motion device is provided in the means connecting said line cutter actuating means with said locks, so that the said locks may be released by separate means without actuation of the line cutter.

5. Apparatus as claimed in claim 4, wherein the means connecting said line cutter actuating means with said locks includes a two-part telescopic shaft, and abutment means on one part of such shaft for limiting the extension of the latter so as to permit the transmission of tension there-through when said line cutter actuating means is operated.

6. Apparatus as claimed in claim 2, wherein releasable means are provided in association with said line cutter actuating means for preventing unintentional movement of the latter to its operative position.

7. In an aircraft ejection seat including locks for securing an airman's harness to said seat, said airman having a personal parachute, release means connected to said locks and acting upon operation to release the same, a drogue parachute adapted to be deployed after ejection of the seat, a line for connecting said drogue parachute to the seat and to the airman's personal parachute, and means on the seat adapted automatically to release said drogue parachute line therefrom after deployment of the drogue parachute and simultaneously to effect, in normal operation, the release of said locks: a line cutter on the ejection seat for severing said line to free the said personal parachute from the ejection seat in the event of the line not being automatically released from the seat; a hand-operable lever for actuating said line cutter; means connecting said lever to the release means for said locks, so that actuation of the line cutter by said lever causes the severance of said line to release the personal parachute from the seat and the simultaneous release of said locks; stop means associated with said lever and spring biased to a position in which it prevents cutter actuating movement of the latter; and means associated with such stop means for moving the latter to a lever freeing position when desired.

8. Apparatus as claimed in claim 7, and including means associated with said lever for preventing unintentional return movement of the latter from its operative to its inoperative position.

9. In an aircraft ejection seat including locks for securing an airman's harness to said seat, said airman having a personal parachute, release means connected to said locks and acting upon operation to release the same, a drogue parachute adapted to be deployed after the ejection of the seat, a line for connecting said drogue parachute to the seat and to the airman's personal parachute, and means on the seat adapted automatically to release said drogue parachute line therefrom after deployment of the drogue parachute and simultaneously to effect, in normal operation, the release of said locks: a gas pressure operated line cutter on the ejection seat for severing said line to free the said personal parachute from the ejection seat in the event of the line not being automatically released from the seat; means connecting said line cutter to the release means for said locks; and means for actuating the line cutter to cause the severance of said line by said line cutter to release the personal parachute from the seat and also for effecting the simultaneous release of said locks.

References Cited in the file of this patent
UNITED STATES PATENTS

| | | |
|---|---|---|
| 2,638,294 | Martin | May 12, 1953 |
| 2,944,774 | Martin | July 12, 1960 |